United States Patent [19]

Schael

[11] Patent Number: 4,632,545

[45] Date of Patent: Dec. 30, 1986

[54] DEVICE FOR TESTING THE BEAM-SETTING OF MOTOR VEHICLE HEADLIGHTS

[76] Inventor: Rudi Schael, Weilstrasse 15, D-6330 Wetzlar 21, Fed. Rep. of Germany

[21] Appl. No.: 702,075

[22] Filed: Feb. 15, 1985

[30] Foreign Application Priority Data

Feb. 17, 1984 [DE] Fed. Rep. of Germany ....... 3405634

[51] Int. Cl.⁴ ............................................... G01J 1/00
[52] U.S. Cl. ..................................... 356/121; 356/123
[58] Field of Search ......................... 356/121, 122, 123

[56] References Cited

U.S. PATENT DOCUMENTS

| | | | |
|---|---|---|---|
| 2,167,803 | 8/1939 | Graham et al. | 356/121 |
| 2,552,116 | 7/1951 | Rodeghiero | 356/122 |
| 3,843,262 | 10/1974 | Cazarer et al. | 356/121 |

*Primary Examiner*—R. A. Rosenberger
*Assistant Examiner*—Crystal D. Cooper
*Attorney, Agent, or Firm*—Wells & Wells

[57] ABSTRACT

A test device for setting motor-vehicle headlight beams is described, which essentially consists of a base plate (1) and the two open-up parts, namely the lens holder (2) and the test surface (3). The lens holder contains an aspheric lens (4) of which the optical axis (5) is parallel to the rest surface (6) of the base plate (1) and simultaneously perpendicular to the test surface when the device is in the opened-up, operational position. The lens is of such height and so corrected that the light of headlights mounted low, normally or high is passed without headlight elevation adjustment and is imaged on the test surface located approximately in the lens focus, and in that the test result is entirely independent of the particular headlight elevation.

7 Claims, 7 Drawing Figures

DEVICE FOR TESTING THE BEAM-SETTING OF MOTOR VEHICLE HEADLIGHTS

BACKGROUND OF THE INVENTION

The invention concerns a device for testing the beam-setting of motor vehicle headlights.

Testers the motor-vehicle headlight settings are needed to perform careful beam settings at short distances in motor vehicle shops at ordinary shop illumination. In principle the light of the headlight to be tested is projected on a test surface when using such testing devices, where the test surface is provided with markings for the standard setting and the tolerance limits. In devices of the state of the art the lens and the test surface are mounted within a common housing, an opening or window allowing the test operator to look at the test surface. The housing is mounted on a support where it can be adjusted in height by a handwheel in order to match the individually varying headlight beam height of the various vehicles. Most supports or tripods are equipped with foot screws allowing levelling the device by means of a box level mounted to it. Lastly the tripods are provided with wheels so that upon completion of the tests on one headlight, the device can be moved to the next and so that the device be mobile in the first place for instance between various sites within one motor vehicle shop.

The device's adjustability in height requires a rigid tripod with an elevation guide and a gear-rack mounted thereto, a pinion mounted on the handcrank engaging this gear rack. Compared to the simple optical operation, these devices incur a high mechanical cost, and the necessary rigid construction entails a substantial weight. As a result the costs of manufacture are relatively high. Furthermore the levelling procedure appears to be meaningful only if simultaneously the motor vehicle being tested is level as well.

SUMMARY OF THE INVENTION

The object of the invention is to develop a test device for the beam-setting of a motor vehicle headlight in a wholly novel manner and in particular to substantially reduce the manufacturing costs of such devices.

This problem is solved by the invention by means of a device envincing the features wherein the test surface 3 is located at a distance s' from the lens 4 and the distance s' is determined by the relationship:

$$(1/s') = (1/f) + (1/s)$$

wherein
s = the distance from the automobile headlights where the light is required to strike the road; and
f' = the focus of the lens 4.

BRIEF DESCRIPTION OF THE DRAWINGS

The drawing shows the test device of the invention in the form of an illustrative embodiment.

DESCRIPTION OF THE PREFERRED EMBODIMENTS

Figure 1A:
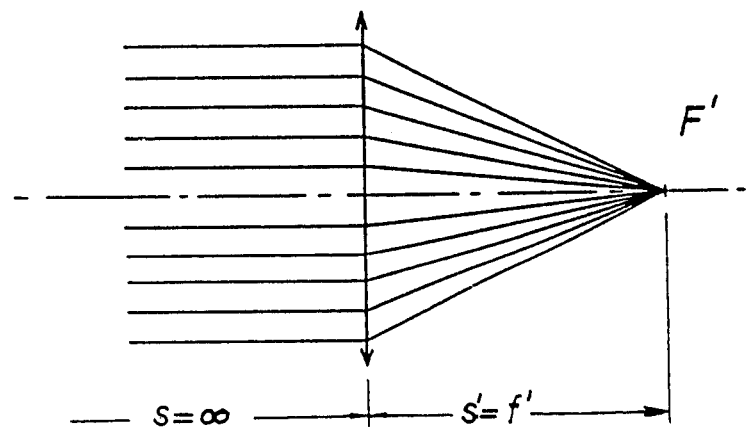
FIG. 1a is a schematic of an incident collimated and axial beam converging at the focus of a condenser lens.

In an essential feature of the test device of the invention, the spherical aberration of the lens 4 is completely or at least almost completely eliminated. Therefore all rays incident parallel to the optical axis intersect the optical axis at the focus F' independently of their incident height above said axis (FIG. 1a). In the known lens formula $$(1/s') = (1/f) + (1/s),$$

this makes the object distance $s = -\infty$, so that the last member of the equation is zero and therefore $s' = f'$, that is, the exit distance equals the focus.

Again, the light of a headlight beaming into infinity is focused at focus F' regardless of its height.

Figure 1B:
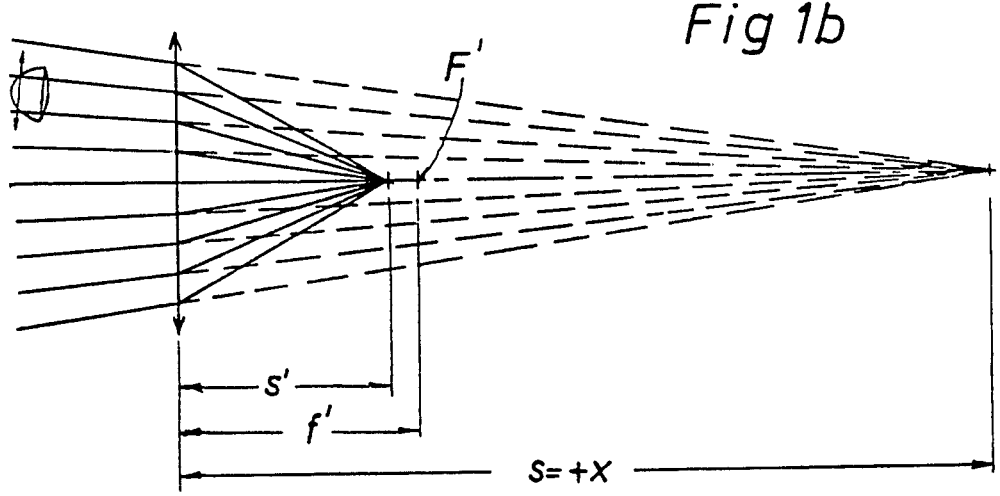
FIG. 1b is a schematic of a converging beam incident on the lens, with the deviation of the image distance from the image-side focus.
Figure 1C:
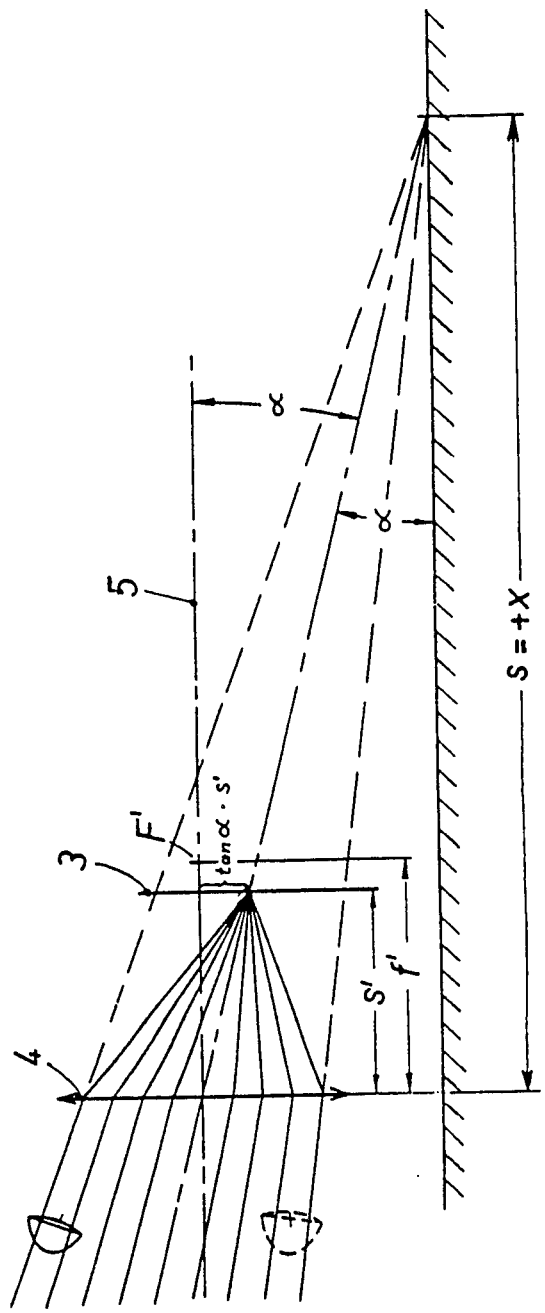
FIG. 1c is a view similar to FIG. 1b which takes into account the incident angle and the beamwidth of the headlight.

When the headlight subtends an angle to the optical lens axis, then the imaging on a test surface 3 mounted in the focal plane will differ in height from F' as shown in FIG. 1c. This image corresponds precisely to the tangent of the angle of incline $\alpha$ multiplied by the focus f.

In order not to dazzle the oncoming traffic, the vehicle may not illuminate the road by more than x meters (FIG. 1c) and on the other hand, so that no depth of vision be lost, a different angle of incline applies for any particular optimal setting, where this angle of incline depends on the height of the headlight. This angle of incline is fully compensated, taking into account the lens formula, namely $$(1/s') = (1/f) + (1/x).$$

Due to the finite size of x, we have $s' < f'$, that is, the test surface must be not at the focus but rather closer to the lens at a distance s' from it (FIG. 1b).

The lens 4 is shown in all Figures in its preferred form of a Fresnel lens integrated into a lens support 2. The lens 4 is vertical when operational, that is, the optical axis 5 is horizontal and parallel to the rest surface 6 of a base plate 1 and simultaneously is perpendicular to the test surface 3 which in turn is located at the focus of the lens 4.

Figure 2:
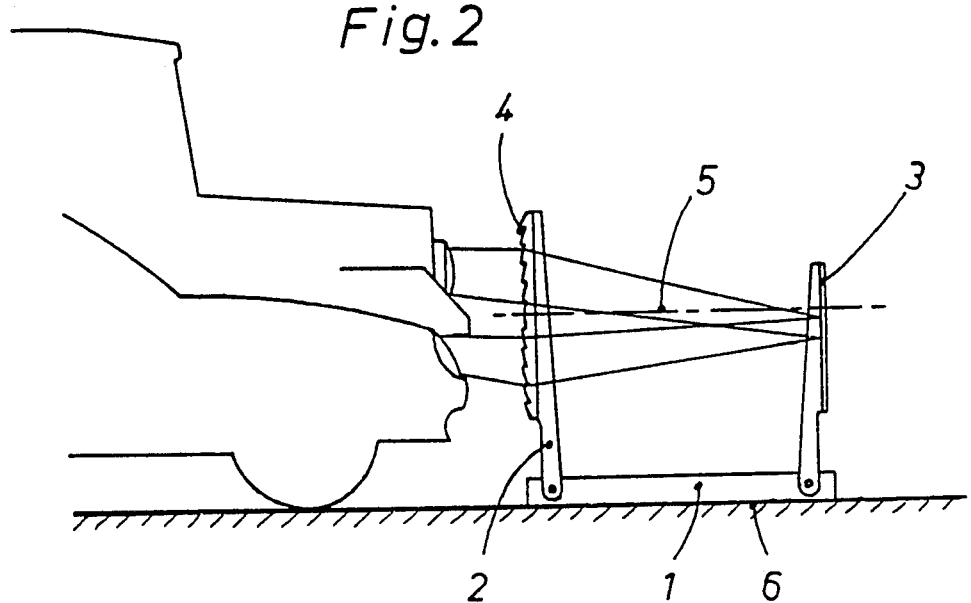
FIG. 2 shows the setup of the test device when operational in front of a a passenger car with headlights at low elevation and a passenger car with headlights at high elevation.
Figure 3:
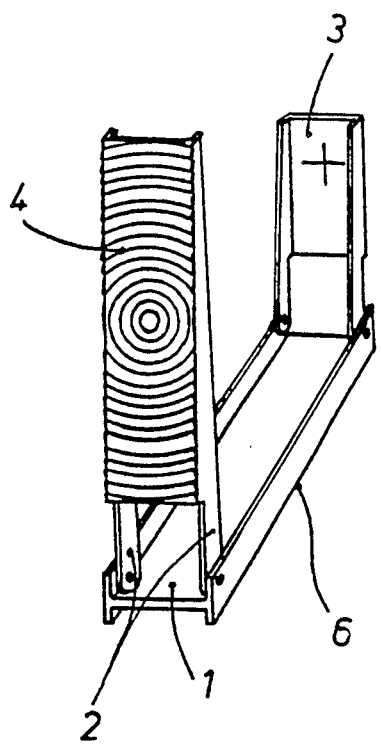
FIG. 3 shows the test device in perspective when in operation.

As shown in FIG. 2, when the headlights are set identically, the light from the lower one is incident on the test surface 3 precisely on the same spot as the light from the higher one and therefore the same test result is obtained. There is merely a beam deflection between the two, depending on the elevation at which each beam passes through the lens 4. Again, if the setting is defective, and regardless of the elevations at which the beams pass through the lens, there will be a deviation of the light on the test surface 3, this deviation corresponding to the tangent of the angular error multiplied by the focus f of the lens 4.

The lens support 2 and the test surface 3 hinge on the base plate 1 and also fold on it. Both parts are kept in the folded-out operational position by a snap-out means (omitted).

Figure 4:
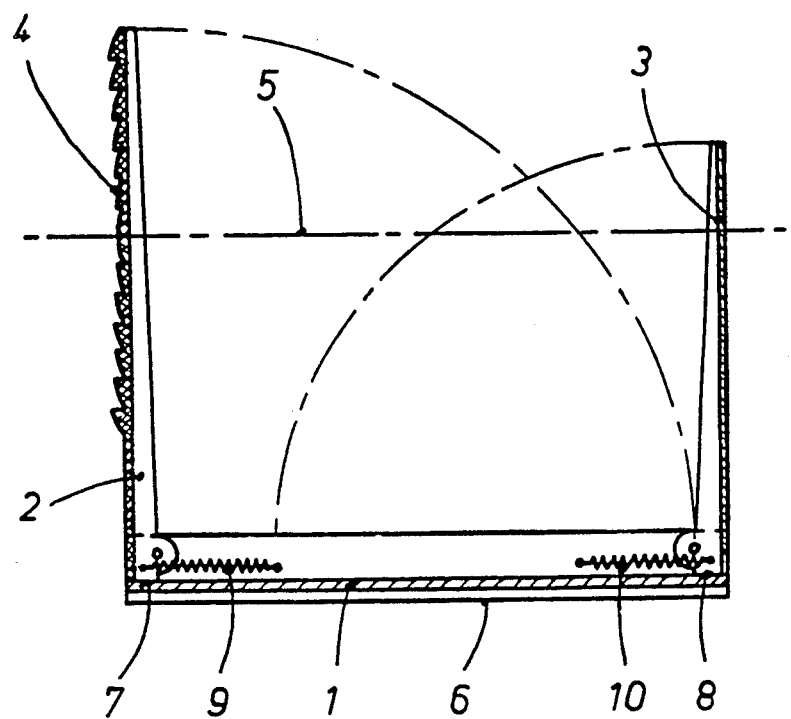
FIG. 4 is the test device in its longitudinal operational section.

Without thereby altering the principle of the invention in any way, the said snap-out means are replaced in FIG. 4 by stops 7 and 8 which are under tension by tension springs 9 and 10 acting also on both the lens support 2 and the test surface 3.

Figure 5:
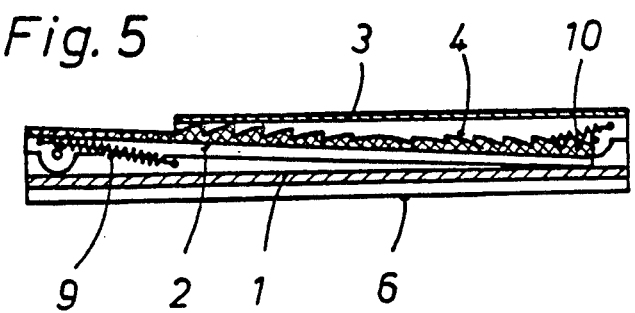
FIG. 5 is a longitudinal section of the test device when folded into its rest position.

FIG. 5 shows the tension springs 9 and 10 keeping the lens support 2 and the test surface 3 in the folded-down rest position as the lens 4 is the most susceptible part of the test device, it is kept protected between the base plate 1 and the test surface 3.

In a simplified embodiment which does not affect the basic features of the invention but foregoes substantial advantages, the three components, namely base plate 1, lens support 2 and the test surface 3 form one rigid unit.

In an especially advantageous embodiment of the invention, the lens support 2 consists of a transparent plastic, the lens 4 being integrated as a component into the lens support.

The test device of the invention offers the particular advantage that the lens corrected for high and low elevations measures headlights mounted high or low without the test result being affected thereby and imaging it on the test surface, without requiring a costly tripod with elevation guidance and setting means. Besides being of a simple construction, easy handling also is offered.

Another advantage offered is that the test device can be folded together when not in use and thereby requires very little space. Moreover, the lens in that condition is located between the base plate and the test surface, and hence, as already explained, is advantageously protected against the roughness of the shop. Lastly, in case of damage, the individual components are easily and rapidly replaced.

For more clarity, the wheels on the base plate 1 have been omitted from the drawings; these wheels however are advantageous to move the test device from one headlight to the next as the testing progresses without having to align again the test device in the direction of vehicle motion.

Again mirrors or broadband sighting means have been omitted; these allow in manner known per se to align the test device in the direction of vehicle motion prior to testing the headlights, while simultaneously also permitting observation of the two front wheels or two other identical points on the right and the left of the vehicle.

I claim:

1. A test device for setting motor-vehicle headlights comprising a lens imaging a headlight to be tested onto a test surface, wherein:
   (a) said lens (4) is provided having a diameter large enough to pass the light of said headlight having low, normal and high mountings;
   (b) said lens (4) corrected over the entire height against spherical abberation;
   (c) said lens (4) held by a lens holder (2) mounted on a base plate (1) and providing an optical axis parallel to a surface of said base plate; and
   (d) said test surface (3) mounted onto the said base plate (1) at a distance approximately s' from said lens (4) and said optical axis is about perpendicular to said test surface where s' is determined from the formula:

$$(1/s') = (1/f') + (1/s)$$

wherein s = the distance from said motor-vehicle leadlights where the light is required to strike the road; and f' is the focus of said lens (4) whereby the test result is independent of the particular headlight elevation.

2. The test device of claim 1, wherein said lens (4) is a Fresnel lens.

3. The test device of claim 1, wherein said lens (4) is an aspherical lens.

4. The test device of claim 3, wherein said lens (4) is formed by a lens center piece corresponding to the normal headlight width and is up to about 300 mm wide.

5. The test device of claim 1, wherein said lens holder (2) and said test surface (3) are hinge mounted on said base plate (1) for folding down.

6. The test device of claim 3, wherein said lens (4) is made of plastic.

7. The test device of claim 6, wherein said lens holder (2) is made of plastic and said lens (4) is integral with said lens holder.

* * * * *